LOAD TRANSIENT REFLECTION SUPPRESSOR WITH DIFFERENTIAL
INDUCTOR MEANS INTERPOSED IN PARALLEL LINE CIRCUITS
BETWEEN THE SOURCE AND LOAD

Filed June 22, 1966

WITNESSES:
Leon M. Garman
James F. Young

INVENTORS
Walter E. Milberger
Wayne L. Weigle.
BY John L. Wiegreffe
ATTORNEY

United States Patent Office 3,405,322

Patented Oct. 8, 1968

3,405,322

LOAD TRANSIENT REFLECTION SUPPRESSOR WITH DIFFERENTIAL INDUCTOR MEANS INTERPOSED IN PARALLEL LINE CIRCUITS BETWEEN THE SOURCE AND LOAD

Walter E. Milberger, Severna Park, and Wayne L. Weigle, Ellicott City, Md., assignors to Westinghouse Electric Corporation, Pittsburgh, Pa., a corporation of Pennsylvania

Filed June 22, 1966, Ser. No. 559,435
5 Claims. (Cl. 317—50)

This invention relates to an arc suppressor and more particularly to a protecting circuit system for protecting a source of voltage from voltage transients reflected from the load.

The concept of the invention is illustrated in connection with a driver circuit for a radar modulator using sensitive solid state devices but it is not so limited.

As is well known, solid state devices are susceptible to high voltages and this places a serious restriction on the application of these devices. Modulators for radar transmitters involve very high voltages and are often subjected to high voltage transients which sometimes cause steep wave front transients to be reflected from the modulator back to the driver circuit.

Heretofore, numerous protection devices have been proposed and used which are sufficiently reliable that they can be used with electron discharge devices but are not capable of acting fast enough to protect the more susceptible solid state devices against the steep wave front transients. Such prior devices conventionally use spark gaps, Zener diodes or diode clamps in various combinations but have proved ineffective because of their slow speed and dynamic impedance limitations. The present invention is directed to a protective system in which differential inductor means is interposed in parallel link circuits between the source of voltage and the load in which one circuit includes fast-acting switch means which keeps the circuit inactive for normal power flow but which is responsive to transients reflected from the load to pass current to the inductor means to produce a blocking backing voltage. In ths illustrated embodiment an unbalanced-to-balanced transmission line transformer is used in combination with a Zener diode serving as the fast-acting switch.

It is an object of the present invention to provide an improved pulse modulator for controlling short pulses of electromagnetic wave energy.

Another object is to provide an improved protection circuit or system which will pass the modulating signals of selected polarity but will not pass a steep wave front transient reflected from a sharp impedance mismatch in the modulator.

A still further object is to provide a protection circuit configuration between a source of potential and its load including differential inductor means connected in parallel link circuits in which one circuit has fast acting switch means unresponsive to the normal voltage of the source but responsive to a voltage transient reflected from the load to pass current to produce a bucking voltage in the differential inductor means.

A still further object is to provide a protection circuit configuration between the driver circuit and a modulator utilizing an unbalanced-to-balanced transformer having a primary and balanced secondaries connected in bucking relation in parallel electrical paths, with one of the paths including fast-acting switch means, such as a Zener diode, so that a pulse of selected polarity from the driver circuit can pass to the modulator but energy cannot be reflected back into the transformer primary as a result of a sharp impedance mismatch in the modulator.

The invention itself, both as to its organization and method of operation, as well as additional objects and advantages will best be understood from the following description read in connection with the accompanying drawing, in which.

Briefly, the present invention provides a protection circuit configuration between a voltage source and a load which is capable of passing signals of a selected amplitude range from the source to the load, but is instantaneously responsive to prevent a steep wave front voltage transient from being reflected from a sudden change in the load impedance, such as that caused by an arc-over.

The invention is illustrated in connection with a protection system interposed between a driver circuit and a modulation amplifier in a radar device. However, it will be apparent to those skilled in the art that the present invention is not limited to this specific application.

The protective action in the illustrated embodiment is accomplished by means of an unbalanced-to-balanced transmission line transformer having a single primary and balanced secondaries, wherein the secondaries are connected in bucking relation in parallel electrical paths, with one path including a fast-acting switch or asymmetrical valve, such as a Zener diode.

It will be apparent that for certain purposes and installations an ordinary diode can be substituted for the Zener diode. For a signal of a selected polarity supplied to the transformer primary the electrical path that includes the diode will be open circuited, so that the voltage induced in the other secondary will be that which is supplied to the load. Any voltage which might be reflected from the load, such as a steep wave transient produced by an arc-over short circuit in the load, will be of a polarity which can pass through the diode and, therefore, generate opposing magneto-motive forces in the transformer core, since the secondaries, as connected, constitute a differential inductor. Therefore, the only flux available to induce a voltage in the primary winding will be that which may be due to any slight difference in dynamic impedance in the paths through the two secondaries.

There will be a small amount of resistance in the diode which can be balanced out with a resistor in the electrical path of the other secondary. However, utilizing diodes which are commercially available, the difference in dynamic impedance between the two circuits can be kept to such a low value that the voltage induced in the primary winding will be within the range of the input signals which will not in any way damage the driver circuit components.

Figure 1:
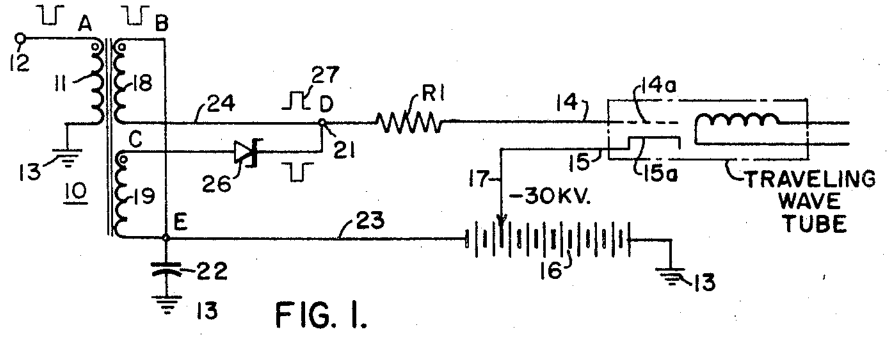
FIGURE 1 is a circuit diagram of one embodiment of the present invention.

Referring to FIGURE 1, an unbalanced-to-balanced modulation transformer 10 having a primary 11 connected to a source of pulse modulation signals represented by the input terminal 12 and common ground 13. The transformer 10 is preferably of the toroidal type and has two secondaries 18 and 19 connected to a load represented by the leads 14 and 15. In the illustrated embodiments the lead 14 might be connected to the grid 14*a* of a traveling wave tube and the lead 15 would then be connected to the cathode 15*a* of such device. The cathode of the traveling wave device is operated at a rather high potential, such as in the neighborhood of 30,000 volts, which may be supplied by means of a conductor 17 from a source of D.C. potential, such as the battery 16. The positive terminal of the battery is connected to the common ground 13 and the bias on the grid 14*a* of the traveling wave tube will be supplied through the circuit which includes the energy absorbing resistor R1, and the secondary windings of the transformer 10. For reasons which will appear hereinafter, it is highly desirable that there be exactly the same amount of flux cutting each of the secondary windings and that the number of turns in each secondary be the same in order to minimize any difference in impedance characteristics. The combination of the conventional transformer design for a low frequency response with a parallel transmission line winding permits bandwidth up to several decades. The transformer 10 is of the type referred to as a transmission line transformer in an article by C. L. Rutheroff in Proc. I.R.E. 47, 1337 (1959). Preferably the windings are wound in bifilar fashion.

As illustrated in the drawings, the secondaries 18 and 19 are phased so that their terminals of opposite polarity are connected to the common output terminal 21 for the system which teminal is connected through the resistor R1 to the grid 14*a*. The opposite terminals of each of the respective secondaries 18 and 19 are coupled through a capacitor 22 to common ground 13. It is apparent from the drawings that the bias on the grid 14*a* is supplied through the conductor 23, the winding 18 and the resistor R1. The primary purpose of the resistor R1 is to dissipate the energy of any arc which might develop in the components of the load, such as the grid 14*a* and the cathode 15*a*.

As illustrated in the drawing, the windings of the transformer 10 are so phased that a pulse of one polarity, say for example a negative-going pulse at the upper end A of primary 11 will produce the same polarity of induced voltage at the upper ends of the secondaries 18 and 19 as at B and C, respectively. Accordingly, a negative-going modulation pulse supplied through the input terminal 12 of primary 11 will produce negative-going pulses at points B and C of the secondaries 18 and 19, respectively. The lower end of secondary 18 is connected by the conductor 24 to the terminal 21 and the upper end C of the secondary 19 is connected through a suitable fast-acting switch, such as a Zener diode 26, to the terminal 21. The Zener diode 26 is back biased by, and open-circuited to, the pulse modulation votage but closes in response to transients reflected from the load. Since the lower end of secondary 18 is connected to the upper end of the secondary 19 the induced voltages in the windings 18 and 19 are in bucking relation. Since the negative-going pulse in the primary 11 induces in the secondary 19 a back-bias on the Zener diode 26, the voltage induced in secondary 19 has no substantial effect upon the voltage induced in the secondary 18 and, accordingly the positive pulses 27 supplied to the terminal 21 are those induced in the secondary 18.

Because the two secondaries 18 and 19 are connected in bucking relation the Zener diode 26 has applied across its electrodes a voltage which is equal to the sum of the voltages induced in the secondaries and is equivalent to two times the voltage across either secondary winding. Preferably the transformer is so designed as to provide the appropriate voltage for the Zener diode used such as to provide pulse clipping to insure a flat-top pulse.

In the event a high voltage arc-over should develop in the load, such as between the grid 14*a* and the cathode 15*a*, resulting in a sharp abrupt change in impedance a steep wave front transient will develop at the point D and transient currents will flow in the parallel paths from the terminal 21, one path including the conductor 24, the winding 18 to the point E and through the conductor 23 and the battery 16 to ground 13; and the other path including the Zener diode 26, the secondary winding 19 to the point E and through the conductor 23 and battery 16 to ground. Since the two balanced legs of the transformer are in opposition a voltage transient reflected from the load will forward bias the Zener diode 26 and the only flux permitted to link the primary winding 11 will be that introduced by the drop across the Zener diode 26. If this should be of any consequence it could readily be balanced out with a suitable resistor.

While the system herein is primarily for the purpose of protecting a source of modulation voltage from voltage surges reflected from the load, it cannot protect the load from voltage breakdowns. Accordingly, conventional protectors, such as circuit breakers or a spark gap, may be utilized.

Figure 2:
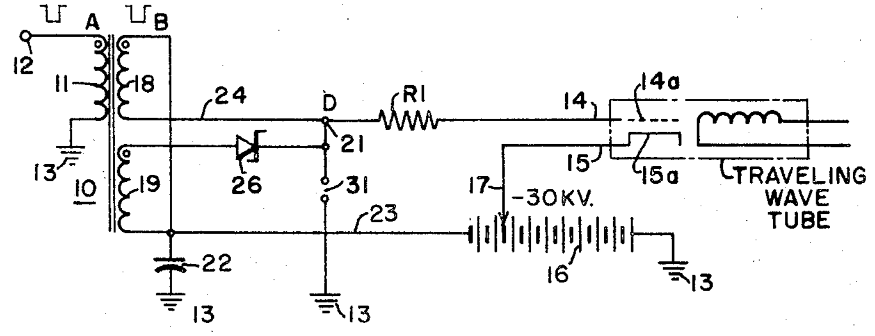
FIG. 2 is a circuit diagram of a modified embodiment.

In the modified embodiment illustrated in FIG. 2, a lower Zener diode may be used if a spark gap 31 is connected between the point 21 and ground 13. The primary purpose of the spark gap 31 is to protect the load against destructive arcs but it also incidentally has the effect of limiting the energy in the reflected transients.

In the embodiment disclosed the Zener diode 26 may have a low threshold since it will be back-biased by the modulation pulses of a selected negative-going polarity. In other words, the Zener diode, acting as a solid state switch will be in the open-circuit condition for the modulation pulses of the illustrated system but will be responsive to voltage transients reflected from the load to change to the closed-circuit condition.

However, the diode 26, or its operational equivalent, could have such operating parameters that it would remain in open-circuit condition for all voltages of either polarity and would change to closed-circuit condition for voltage transients above a selected operating voltage level in order to provide the protection against reflected voltage transients.

Although the system described is particularly designed to protect a source of pulse modulation signals against transients which may be reflected from sharp impedance mismatches in the load, such as those due to voltage breakdowns, the basic concept could be extended for protecting a power transmission line carrying AC. In such a system two fast-acting switches, corresponding to the diode 26, may be connected in back-to-back relation in a place in a protective system corresponding to the place where diode 26 is located. The fast-acting switches would be chosen to have such parameters that they would remain open-circuited for the normal AC operating voltages but would close in response to voltage transients at a selected value above the normal operating voltage. Thus the operation would be substantially the same as that of the embodiment illustrated.

The effective difference between the illustrated embodiment and the one for handling AC would be, that whereas in the system described for modulation signals of a selected polarity the diode 26 may be reverse biased to hold it in open circuit condition, in the other instance the diodes would merely require a higher forward bias to put them in closed condition. The forward bias for closing condition should be slightly above their avalanche condition. Such devices are well known in the art.

In either instance the transmission line transformer illustrated with its balanced secondary windings illustrated may be considered to be a differential inductor for generating bucking electromotive forces.

What is claimed is:

1. A system for protecting equipment at one point in a transmission line from voltage transients reflected from a second point in said transmission line comprising: differential inductor means having a winding with a common reference input-output terminal and a pair of terminals in balanced relation on either side of said reference terminal; an output terminal for said system; one of said pair of terminals being connected to said system output terminal; and a fast-acting switch connected between the other of said pair of terminals and said system output terminal, said switch being normally in open-circuit condition for applied voltages within the normal operating voltage range but responsive to reflected voltage transients above said operating voltage to close and pass current to produce a bucking magnetomotive force in said differential inductor means.

2. The combination as set forth in claim 1 in which said differential inductor means is a transformer having first and second secondary windings having ends of opposite polarity connected to said common reference input-output terminal, with the other terminal of said first secondary being connected to said output terminal for said system; a fast-acting switch connected between the other terminal of said second secondary and said system output terminal, said switch being normally in open-circuit condition for applied voltages within the normal operating voltage range but responsive to voltage transients reflected from said driven circuit to close and pass current through said second secondary to produce a magnetomotive force in said second secondary opposing the magnetomotive force in said first secondary.

3. The combination as set forth in claim 2 in which said secondary windings are bifilar.

4. The combination as set forth in claim 1 in which said fast-acting switch means includes a Zener diode.

5. The combination as set forth in claim 2 in which said fast-acting switch means includes a Zener diode.

References Cited

UNITED STATES PATENTS

| | | | |
|---|---|---|---|
| 1,994,921 | 3/1935 | Rose | 317—50 |
| 2,542,367 | 2/1951 | Seaman | 317—14 |
| 3,085,187 | 4/1963 | Godshalk | 317—43 X |
| 3,177,403 | 4/1965 | Baycura | 317—50 X |
| 3,277,342 | 10/1966 | Ross | 317—27 |
| 3,296,492 | 1/1967 | Drozdov et al. | 317—14 |

LEE T. HIX, *Primary Examiner.*

R. V. LUPO, *Assistant Examiner.*